(12) United States Patent
Thaler

(10) Patent No.: US 12,306,124 B2
(45) Date of Patent: May 20, 2025

(54) MEASURING DEVICE HAVING AN ELECTROTHERMAL TRANSDUCER FOR ADJUSTING A THERMAL RESISTANCE, AND METHOD OF OPERATING THE SAME

(71) Applicant: Anton Paar GmbH, Graz (AT)

(72) Inventor: Philipp Thaler, Graz (AT)

(73) Assignee: Anton Paar GmbH, Graz (AT)

( * ) Notice: Subject to any disclaimer, the term of this patent is extended or adjusted under 35 U.S.C. 154(b) by 787 days.

(21) Appl. No.: 17/452,759

(22) Filed: Oct. 28, 2021

(65) Prior Publication Data

US 2022/0136989 A1 May 5, 2022

(30) Foreign Application Priority Data

Oct. 30, 2020 (AT) .............................. A 50935/2020

(51) Int. Cl.
| | | |
|---|---|---|
| G01K 17/08 | (2006.01) | |
| G01N 1/42 | (2006.01) | |
| G01N 1/44 | (2006.01) | |
| G01N 25/00 | (2006.01) | |
| G01N 25/20 | (2006.01) | |

(52) U.S. Cl.
CPC ............... *G01N 25/20* (2013.01); *G01N 1/42* (2013.01); *G01N 1/44* (2013.01); *G01K 17/08* (2013.01); *G01N 25/00* (2013.01)

(58) Field of Classification Search
CPC ........... G01N 25/20; G01N 1/42; G01N 1/44; G01N 25/00; G01K 17/08
USPC .................. 374/31, 32, 33; 422/51; 436/147
See application file for complete search history.

(56) References Cited

U.S. PATENT DOCUMENTS

| | | | |
|---|---|---|---|
| 4,530,608 A | * | 7/1985 | O'Neill .................. G01K 17/00 236/78 A |
| 6,523,998 B1 | | 2/2003 | Danley et al. |
| 7,275,862 B2 | | 10/2007 | Nishimura et al. |

(Continued)

FOREIGN PATENT DOCUMENTS

| | | | | |
|---|---|---|---|---|
| DE | 27 41 877 A1 | | 3/1978 | |
| DE | 102010008568 A1 | * | 8/2010 | ......... G01N 25/4866 |

(Continued)

OTHER PUBLICATIONS

17452759_2024-07-18_JP_2003229520_A_H.pdf,Aug. 15, 2003.*

(Continued)

*Primary Examiner* — Gail Kaplan Verbitsky
(74) *Attorney, Agent, or Firm* — Dicke, Billig & Czaja, PLLC

(57) ABSTRACT

A measuring device for thermal analysis of a sample is described, the measuring device comprising: (i) a sample receptacle for receiving the sample, (ii) a heating device for increasing the temperature of the sample receptacle, (iii) a cooling device for reducing the temperature of the sample receptacle, and (iv) a heat transport element having a thermal resistance and being arranged between the heating device and the cooling device such that a heat flow between the heating device and the cooling device via the heat transport element is enabled. Further, the measuring device v) comprises an electrothermal transducer arranged between the heat transport element and the cooling device such that operating the electrothermal transducer adjusts the heat flow through the heat transport element.

18 Claims, 2 Drawing Sheets

(56) References Cited

U.S. PATENT DOCUMENTS

| | | | |
|---|---|---|---|
| 8,066,429 B2 | 11/2011 | Danley | |
| 8,087,821 B2 | 1/2012 | Danley | |
| 9,310,263 B2 | 1/2016 | Thoen et al. | |
| 2003/0058918 A1* | 3/2003 | Fischer | G01K 17/04 374/E17.006 |
| 2005/0002435 A1* | 1/2005 | Hashimoto | G01N 25/72 374/43 |
| 2005/0058178 A1* | 3/2005 | Shih | G01N 3/18 374/45 |
| 2007/0189357 A1* | 8/2007 | Nishimura | G01N 25/4866 374/10 |
| 2008/0151962 A1* | 6/2008 | Teramoto | G01N 25/20 374/E17.008 |
| 2010/0220764 A1* | 9/2010 | Nishimura | G01N 25/4866 374/33 |
| 2011/0164652 A1 | 7/2011 | ReFalo et al. | |
| 2011/0188534 A1* | 8/2011 | Nishimura | G01N 25/4866 374/33 |
| 2015/0253206 A1 | 9/2015 | Danley | |
| 2023/0296452 A1* | 9/2023 | Lacouture | G01K 17/00 374/33 |

FOREIGN PATENT DOCUMENTS

| | | | | |
|---|---|---|---|---|
| FR | 3 028 948 B1 | | 5/2016 | |
| FR | 3028948 A1 | * | 5/2016 | G01K 17/04 |
| GB | 2547113 A | * | 8/2017 | G01N 25/20 |
| JP | H11174009 A | * | 7/1999 | |
| JP | 2003229520 A | | 8/2003 | |
| JP | 2004020509 A | * | 1/2004 | |
| JP | 2006275713 A | * | 10/2006 | |
| JP | 2009-180507 A | | 8/2009 | |
| JP | 2014159976 A | * | 9/2014 | |
| JP | 2018200207 A | | 12/2018 | |
| KR | 20230152096 A | * | 11/2023 | |
| WO | WO-8912502 A | * | 12/1989 | B01L 7/52 |
| WO | WO-8912502 A1 | * | 12/1989 | |
| WO | WO 2008/153913 A1 | | 12/2008 | |
| WO | WO-2009149333 A1 | * | 12/2009 | G01K 17/04 |
| WO | 2011060768 A1 | | 5/2011 | |
| WO | WO 2012/103601 A1 | | 8/2012 | |
| WO | WO-2014039376 A2 | * | 3/2014 | G01K 17/08 |

OTHER PUBLICATIONS

17452759_2024-07-19_DE_102010008568_A1_H.pdf,Aug. 26, 2010.*
17452759_2024-07-22_JP_2004020509_A_H.pdf,Jan. 22, 2004.*
17452759_2024-07-24_JP_2014159976_A_H.pdf,Sep. 4, 2014.*
17452759_2024-07-24_JP_H11174009_A_H.pdf,Jul. 2, 1999.*
17452759_2024-07-24_KR_20230152096_A_H.pdf,Nov. 2, 2023.*
17452759_2024-07-24_WO_2009149333_A1_H.pdf,Dec. 10, 2009.*
17452759_2024-07-24_WO_8912502_A_H.pdf,Dec. 28, 1989.*
17452759_2024-11-26_FR_3028948_A1_H.pdf,May 27, 2016.*
17452759_2024-11-26_JP_2004020509_A_H.pdf,Jan. 22, 2004.*
17452759_2024-11-26_JP_2006275713_A_H.pdf,Oct. 12, 2006.*
17452759_2024-11-26_GB_2547113_A_H.pdf,Aug. 9, 2017.*
17452759_2025-02-05_JP_2004020509_A_H.pdf,Jan. 22, 2004.*
17452759_2025-02-05_WO_2014039376_A2_H.pdf,Mar. 13, 2014.*
European Office action for Application No. 21 204 167.7, dated Feb. 3, 2023, 4 pages.
European Search Report for Application No. 21204167.7, dated Apr. 8, 2022, 7 pages.
Office Action of A50935/2020, Sep. 10, 2021, 4 pages.
DIN 53765, DIN 51007, ASTM E 474, ASTM D 3418, W. F. Hemminger, H. K. Cammenga: Methoden der Thermischen Analyse, Springer-Verlag. ISBN 3-540-15049-8 (dt. Ausgabe), ISBN 0-387-15049-8 (engl. Ausgabe) with English translation, 4 pages, https://www.chemie.de/lexikon/Dynamische_Differenzkalorimetrie.html.
https://de.wikipedia.org/wiki/Peltier-Element with English translation, 8 pages.

* cited by examiner

MEASURING DEVICE HAVING AN ELECTROTHERMAL TRANSDUCER FOR ADJUSTING A THERMAL RESISTANCE, AND METHOD OF OPERATING THE SAME

This application claims priority to Austrian Patent Application No. A50935/2020 filed 30 Oct. 2020, the disclosure of which is hereby incorporated herein by reference.

TECHNICAL FIELD

Embodiments of the invention relate to a measuring device for thermal analysis, in particular for a (thermal) differential measurement. Furthermore, embodiments of the invention relate to a method for operating a measuring device. Furthermore, embodiments of the invention relate to a specific use of a Peltier element.

Thus, embodiments of the invention may be in the technical field of measuring devices for thermal analysis. In particular, embodiments of the invention may be in the technical field of differential scanning calorimeters or measuring devices for differential thermal analysis.

BACKGROUND

Measuring devices for thermal analysis are known in principle and include, for example, differential scanning calorimeters (DSC) and differential thermal analysis (DTA). Such a measuring device generally comprises a furnace (an oven) in which two sample containers are located, one sample container being provided with a sample and the other with a reference (the reference can also simply be an empty sample container). This setup allows the measurement of various physical properties that are related to a temperature change. If, for example, phase transitions or phase transformations occur in the sample, a temperature difference is generated between the sample container with the sample and the sample container with the reference (for the same amount of heat supplied by the furnace). The temperature difference or the heat flow between the sample and the reference is then measured by means of sensors, which allows conclusions about the type of the phase transition or the phase transformation.

Generally, such a measuring device comprises a heating system with an electric heater that heats a furnace according to a time-temperature profile. For thermal measurements, however, not only heating curves (rising temperature profiles) but also cooling curves (falling temperature profiles) are important. A mere turning off (switching off) the electrical heating is not sufficient for many measurement applications to achieve a required fast cooling rate. For this reason, active cooling by means of a cooling system is required.

During heating by the heating system, it should be ensured on the one hand that not too much heat is transferred from the furnace to the cooling system, as otherwise the heating rates cannot be maintained. On the other hand, it should be possible to dissipate the heat sufficiently quickly towards the cooling system during each cooling process. In order to counteract this problem, it is known in the prior art to arrange a so-called thermal resistor as a connecting piece between the heating system and the cooling system.

However, due to the generally compact design of a calorimeter, the electrical heating of the heating system is limited in its performance. If the thermal resistance is too low, the heating system heats up too slowly and/or can no longer reach its target temperature. If the thermal resistance is too high, however, the heat cannot be dissipated quickly enough towards the cooling system during a cooling process.

In other words, the disadvantage is that the thermal resistor dissipates too much heat from the heating system in the heating phase and too little heat from the heating system in the cooling phase. However, the thermal resistor is a fixedly installed element which is preferably made of a particularly thermally conductive metal.

There may be a need to provide a measuring device for thermal analysis which has an efficient and dynamic heat flow (in particular wherein a thermal resistance is as high as possible during a heating phase and as low as possible during a cooling phase).

According to an aspect of the present invention, a measuring device (e.g. a differential scanning calorimeter) for thermal analysis of a sample is described, the measuring device comprising: i) a sample receptacle (sample holder, sample chamber or measuring chamber) for receiving (holding) the sample (and in particular also a reference), ii) a heating device for increasing the temperature (in particular for providing a temperature profile) of the sample receptacle, iii) a cooling device for reducing the temperature (in particular for providing a temperature profile) of the sample receptacle, iv) a heat transport element (e.g. an element comprising a particularly thermally conductive metal) having a thermal resistance (or a high thermal conductivity) and which is arranged between the heating device and the cooling device in such a way that a heat flow between the heating device and the cooling device is enabled via the heat transport element, and v) an electrothermal transducer (in particular which may be operated in a heating mode and a cooling mode, e.g. a Peltier element), which is arranged between the heat transport element and the cooling device in such a way that operating (in particular controlling or regulating) the electrothermal transducer (selectively, specifically) adjusts the heat flow through the heat transport element (or (selectively, specifically) adjusts the thermal resistance of a heat transport path through the heat transport element and the electrothermal transducer).

According to a further aspect of the present invention, a method of operating a measuring device (in particular as described above) for thermal analysis is described, comprising a heating device and a cooling device, which are (thermally conductively) coupled to each other via a heat transport element by a heat flow. The method comprising: i) providing an electrothermal transducer between the heat transport element and the cooling device, ii) operating (in particular controlling or regulating) the electrothermal transducer in a heating mode or turning off the electrothermal transducer in order to reduce the heat flow through the heat transport element (or in order to increase the thermal resistance of the heat transport path through the heat transport element and the electrothermal transducer) (in particular when providing a temperature increase (with respect to a sample)), and iii) operating (in particular controlling or regulating) the electrothermal transducer in a cooling mode in order to increase the heat flow through the heat transport element (or in order to reduce the thermal resistance of the heat transport path through the heat transport element and the electrothermal transducer) (in particular when providing a temperature reduction (with respect to the sample)).

According to another aspect of the present invention, a use of a Peltier element is described for (selectively) adjusting a heat flow through a heat transport element (arranged) between a heating device and a cooling device within a measuring device for thermal analysis (in particular wherein the spatial arrangement of the Peltier element prevents a direct contact between the heat transport element and the cooling device).

According to another aspect of the present invention, a computer program product is described which is configured, when operated on a computer (in particular a control unit, further in particular a measuring device), to execute a method for operating a measuring device for thermal analysis (as described above).

DETAILED DESCRIPTION OF EXEMPLARY EMBODIMENTS

In this document, the term "measuring device" may in particular refer to a device which is adapted to measure physical properties of a sample. Preferably, the physical properties are thermal properties or properties that are/become observable with a change in ambient temperature. Examples of such properties may include: melting and glass transition temperatures (in particular for plastics), kinetic observations of chemical reactions, specific heat capacities, determination of the purity of substances (due to the change in melting point caused by impurities).

In this document, the term "sample receptacle" may refer to any device on or in a measuring device that is suitable for receiving (holding) a sample to be measured. In particular, a sample receptacle may comprise at least one sample container (e.g. a crucible) in which the sample is provided for measurement. For example, if the measuring device is to perform a differential measurement (difference measurement), two sample containers are provided, one for the sample and another for the reference (which may be empty). The sample receptacle may further comprise known sensor means, for example to detect temperature changes in/at the sample containers during a measurement. Recorded data may be forwarded to a control unit and/or an evaluation unit.

In this document, the term "heating device" may refer to any device suitable for providing an increase of temperature (or a heating) to a sample receptacle or measuring chamber. The heating device may comprise a heating element (or a plurality of heating elements) for this purpose. For example, the heating device may comprise an electrical heating element which is particularly suitable for providing heat to the environment when supplied with electrical energy. For example, a heating element may comprise a heating wire, a heating cable, a heating foil, or a heating surface. Also, a heating element may be implemented, for example, by a copper sheet or copper trace. The heating device may be controlled (or regulated) such that a time-dependent temperature profile (or a temperature gradation) is provided to the sample receptacle (as described above). The heating device may be directly coupled to the sample receptacle, or may be spatially separate therefrom. For example, the heating device may be arranged below the sample receptacle or may be located in a circular manner around the sample receptacle.

In this document, the term "cooling device" may refer to any device capable of providing a temperature reduction (or a cooling) in the environment of a sample receptacle. In a simple embodiment, the cooling device may be a heat pipe or a heat sink that removes or dissipates heat in a known manner. In another embodiment, the cooling device may comprise a cavity in which a cooling medium is stored or circulated. The cooling medium may be, for example, cold air, liquid nitrogen, helium, or other known cooling media. Further, a known cryostat may also be used. Further, the cooling device may comprise a Peltier element used in a cooling mode. Such a Peltier element within the cooling device, operated (exclusively) in a cooling mode, should in no way be confused with the electrothermal transducer described below. The cooling device may be controlled (or regulated) such that a time-dependent temperature profile (or a temperature gradation) is provided to a sample receptacle (as described above). Preferably, the cooling device may be arranged at least partially around (surrounding) the heating device and/or the sample receptacle. In particular, the cooling device may be arranged spatially remote from the sample receptacle. Preferably, the heating device is spatially closer to the sample receptacle than the cooling device.

In this document, the term "heat transport element" may in particular refer to an element (or component) which has a specific thermal conductivity or a specific thermal resistance and which may be installed for the purpose of providing heat transport or heat flow. For example, a heat transport element may be provided between a heating device and a cooling device so that a heat flow takes place between the two devices via the heat transport element. In principle, the heat transport element may be provided in any shape and size. For example, a possible examplary embodiment is described in FIG. 3 below. Preferably, the heat transport element comprises a particularly thermally conductive material. In particular, this may be a metal or a metal alloy. For example, nickel or copper (also as an alloy) may be used. In principle, other particularly thermally conductive materials are also conceivable, such as a functional ceramic or diamond-like carbon.

As used herein, the term "electrothermal transducer" may particularly refer to an element that provides a temperature difference in the presence of a current flow and, conversely, a current flow in the presence of a temperature difference.

Thus, an electrothermal transducer (or electrothermal converter) may be operated in a cooling mode and (when the current direction is reversed) may be used in a heating mode. Thus, a particular desired mode of operation may be provided by actuation or activation by means of current supply (a control or regulation). In coupling with a heat transport element (as described above), the thermal resistance of this electrothermal transducer may be adjusted selectively and dynamically. For this purpose, the electrothermal element should be positioned spatially close (in particular in direct contact) to the heat transport element. Particularly preferably, the electrothermal element is arranged between the heat transport element and the cooling device in such a manner that a contact between the cooling device and the heat transport element is prevented (rendered impossible) by the electrothermal element. It has shown that operating an electrothermal transducer in a heating mode or turning off the electrothermal transducer may selectively increase the thermal resistance of a heat transport path between the heating device and the cooling device, while operating an electrothermal transducer in a cooling mode may selectively reduce the thermal resistance of the heat transport path.

According to an exemplary embodiment, the thermal resistance ($R_{th}=l/\lambda*A$) of the heat transport element remains in principle the same or does not change. However, the thermal resistance of the electrothermal transducer and thus the thermal resistance of a heat transport path may be influenced/adjusted by the heat transport element and the electrothermal transducer. In this document, the term "heat transport path" may in particular refer to components arranged between the heating device and cooling device (e.g., heat transport element and electrothermal transducer). The thermal resistance of the heat transport element may be, for example, between 3 K/W and 9 K/W. The thermal resistance of the electrothermal transducer may be, for example, between −90 K/W and +50 K/W.

According to an embodiment, by influencing a temperature difference, in particular between the heating device and the cooling device, the heat flow through the heat transport element may be increased or reduced as follows:

Heat flow/heat flux (Watt,heat output): $Q=\Delta T/R_{th}$.

Thus, operating the electrothermal transducer adjusts the heat flow through the heat transport element.

According to an embodiment, an "adjustment" may be performed as follows: the thermal resistance of the heat transport path (or the heat flow through the heat transport element) may be increased or may be decreased, or a desired range of values of the thermal resistance of the heat transport path may be adjusted.

In particular, "adjusting" the thermal resistance of the heat transport path of the heat transport element and the electrothermal transducer (or the heat flow through the heat transport element) may be achieved in that the electrothermal transducer pumps heat across the heat transport path against or in the direction of the temperature gradient (between the heating device and the cooling device).

In particular, the thermal resistance of the heat transport path (or the heat flow through the heat transport element) may be adjusted to a desired value by varying the heat pumping power of the electrothermal transducer. For example, a BiTe-based Peltier element may be used as the electrothermal transducer, and both the operating current and the polarity of the operating voltage may be freely selected in order to achieve the effects mentioned.

According to an exemplary embodiment, the invention is based on the idea that a measuring device for thermal analysis may be provided, which has an efficient and dynamic heat flow, if an electrothermal transducer is provided between a heat transport element and a cooling device in such a way that a selective operation of the electrothermal transducer dynamically adjusts the heat flow through the heat transport element (or the thermal resistance of the heat transport path through the heat transport element and the electrothermal transducer). In this way, a thermal resistance is provided within the measuring device which may be as high as possible during a heating phase and as low as possible during a cooling phase.

Conventionally, a compromise between heating and cooling is provided with respect to the heat flow in a measuring device such as a calorimeter by providing a heat transport component whose thermal resistance is an average value (or compromise value) and which is invariant (the heat transport component is usually a static component made of metal or ceramic).

However, the inventor has now surprisingly found that a selectively adjustable (and thus dynamically operable) heat flow (or thermal resistance) may be realized in an efficient yet simple manner if an electrothermal transducer (e.g., a Peltier element) is installed between the heat transport element and the cooling device.

The measuring device according to the invention offers significantly faster heating and cooling rates than conventional measuring devices and thus a particularly efficient mode of operation. Moreover, the setup described may be integrated into existing systems in a simple and flexible manner.

It may be considered well known that Peltier elements are used in measuring devices as an additional heating device or additional cooling device. However, a fundamental idea of the invention is that the electrothermal transducer is not used as an additional heater or additional cooler, but serves the sole purpose of selectively and dynamically adapting the thermal resistance in the heat flow between the heating device and the cooling device to the required conditions. Thus, the electrothermal transducer in the claimed measuring device fulfils a completely different technical task than in the prior art. Accordingly, the electrothermal transducer in the claimed measuring device is also positioned in a completely different manner, namely directly between the cooling device and the heat transport element.

In the following, additional exemplary embodiments of the device and method are described.

According to an embodiment, the electrothermal transducer may be operated in a heating mode as well as in a cooling mode. This results in the particular advantage that a highly efficient dynamic adjustability of a thermal resistance is enabled in a simple manner. An electrothermal transducer with the described mode of operation may be realized in various ways.

In particular, the electrothermal transducer may be implemented particularly advantageously (efficiently and directly) by means of a known Peltier element. In principle, any series and/or parallel connection of Peltier elements may be used to realize the electrothermal transducer. In an embodiment, Peltier elements have a non-symmetrical structure (they have a designated cold side), wherein the cold side may face both the heat transport element side and the cooling device side to change the thermal resistance. Correspondingly, Peltier elements may have a hot side, wherein the hot side may face both the heat transport element side and the cooling device side to change the thermal resistance.

According to a further embodiment, the electrothermal transducer is arranged between the heat transport element and the cooling device in such a way that a direct contact between the heat transport element and the cooling device is prevented. In other words, positioning the electrothermal transducer directly between the cooling device and the heat transport element prevents a physical contact. This results in the advantage that an adjustability of the thermal resistance (of the heat transport element) is enabled independently of a direct influence of the cooling device, and thus more efficiently. Without this physical separation, the cooling provided by the cooling device could undesirably influence the thermal resistance of the heat transport element.

In an embodiment, due to the separation of the heating device from the cooling device (in the hot state of the sample chamber), due to a large thermal resistance, considerably less through heating of the cooling device occurs than in the case of a small thermal resistance. If the heating device is now turned off at high temperature and the thermal resistance is set to a small value, the full cooling performance of the (not heated through) cooling device is immediately available.

According to a further embodiment, the sample receptacle comprises two sample containers, and the measuring device is configured to perform a differential measurement with respect to the two sample containers. In this way, the described advantageous measuring device may be used directly for industry-relevant measurements.

In an exemplary embodiment, an encapsulated sample container, e.g. a crucible made of aluminum, with a sample, and a second sample container without contents (reference) are subjected to a similar temperature program. Temperature changes occur in comparison to the empty sample container as a result of the heat capacity of the sample and exothermic or endothermic processes or phase changes such as melting or evaporation, because thermal energy flows into or out of the corresponding process.

According to a further embodiment, the measuring device is a differential scanning calorimeter or a differential thermal analysis measuring device. Also in this way, the described advantageous measuring device may be used directly for industry-relevant measurements. DSC and DTA are known in principle (see above), but may be carried out particularly efficiently by means of the described measuring device.

According to a further embodiment, the heating device is adapted to provide a time-dependent increasing (rising) temperature profile. Additionally or alternatively, the cooling device is adapted to provide a time-dependent decreasing temperature profile. Heating and/or cooling device thus do not only serve for heating/cooling per se, but do so specifically to provide a certain temperature (time) profile to the sample to be measured.

According to a further embodiment, the cooling device comprises at least one of the group consisting of: a heat pipe, a heat sink, a cryostat, a Peltier element, a heat exchanger. This may have the advantage that known and established cooling systems may be implemented directly. The cooling device is in particular designed as a closed unit which may be spatially separated from further components of the measuring device (heat transport element, heating device) by means of an electrothermal transducer.

In an embodiment, the thermal energy dissipated by the Peltier element on its cold side is dispensed again on the hot side of the Peltier element. Advantageously (in particular with regard to efficiency and protection of the Peltier element), the hot side of the Peltier element is cooled, for example by means of direct air cooling. In an exemplary embodiment, the mere surface of the Peltier element is not sufficient, but—in order to be able to dissipate the energy—a heat exchanger may be used, for example. An exemplary embodiment for such a heat exchanger would be a known fin-type heat sink.

According to a further embodiment, the measuring device is configured such that operating the electrothermal transducer comprises: controlling or regulating the thermal resistance of the heat transport path. This has the advantage that a dynamic (in particular stepless) adjustment of the thermal resistance may be implemented.

This control/regulation may be done automatically by means of a control unit of the measuring device. For example, a respective computer program may be stored on a data carrier for this purpose. In a particular embodiment, the control unit may also have an artificial intelligence (e.g. by means of neuronal networks), which further improves the control/regulation by means of a self-learning algorithm. Further, the control/regulation may also be performed manually by a user (in particular during measurement). The control of the electrothermal transducer, in particular Peltier element, may be performed in a known manner.

According to a further embodiment, the measuring device is configured such that operating the electrothermal transducer in a heating mode (or turning off the electrothermal transducer) reduces the heat flow through the heat transport element (or increases the thermal resistance of the heat transport path). Additionally or alternatively, the measuring device is configured such that operating the electrothermal transducer in a cooling mode increases the heat flow through the heat transport element (or reduces the thermal resistance of the heat transport path).

Due to the increased thermal resistance, less produced heat is transported away from the heating device. At the same time, the increased thermal resistance acts as a shield against the cooling device. Due to the reduced thermal resistance, the heat of the heated sample receptacle may be transported away quickly. At the same time, the cooling effect of the cooling device is now no longer shielded.

By this advantageous embodiment the following operating procedure may be enabled:
(i) providing a sample in a sample receptacle of the measuring device,)
ii) increasing the thermal resistance of the heat transport path when the temperature of the sample receptacle is increased, and/or iii) reducing the thermal resistance of the heat transport path when the temperature of the sample receptacle is reduced.

According to a further embodiment, the measuring device is configured such that operating the electrothermal transducer in a cooling mode allows the provision of a lower temperature (in particular minus 20° C. or less, further in particular minus 30° C. or less, further in particular minus 40° C. or less) in the measuring device than without operating the electrothermal transducer in the cooling mode. This may have the advantage that, in addition to the dynamic adjustment of the thermal resistance, a particularly efficient cooling and lower minimum temperature of the sample chamber is enabled.

The electrothermal transducer may be used when using the cooling device to lower the lowest possible temperature. In this way, significantly low temperatures of the measuring chamber (down to −40° C.) may be achieved with normal cooling (e.g. air cooling). The use of the described measuring device increases the possible speed of temperature changes and enables a lower minimum temperature than the cooling device on its own.

According to a further exemplary embodiment, the heat transport element comprises a metal (e.g. nickel or a nickel alloy, copper or a copper alloy, aluminium or an aluminium alloy, a functional ceramic). This may have the advantage of providing effective and robust heat flow using established and proven materials.

Before describing the figures in detail, some specific embodiments of the invention are explained below.

According to an exemplary embodiment, it would be advantageous for a dynamic temperature control if the thermal resistance between the sample chamber (sample receptacle) and the cooling system (cooling device) were high during heating (or when high temperatures are to be maintained), or if the thermal resistance between the sample chamber and the cooling system were low during cooling (or when low temperatures are to be achieved). This problem is solved in that Peltier elements act as variable thermal resistors, which is advantageous for the dynamics and thermal design of the entire measuring device. The Peltier elements do not represent an additional heating or cooling for the furnace (heating device).

According to another exemplary embodiment, in the heating phase of the measuring device, a Peltier element is brought into heating operation (or alternatively turned off) and the thermal resistance becomes high. In the cooling phase, the Peltier element is brought into cooling mode and a low thermal resistance is established (use of Peltier elements as variable thermal resistance between heating device and cooling device). If the Peltier element is not energized or the Peltier element heats up, the thermal resistance between the heating device and the cooling device is high.

Figure 1:
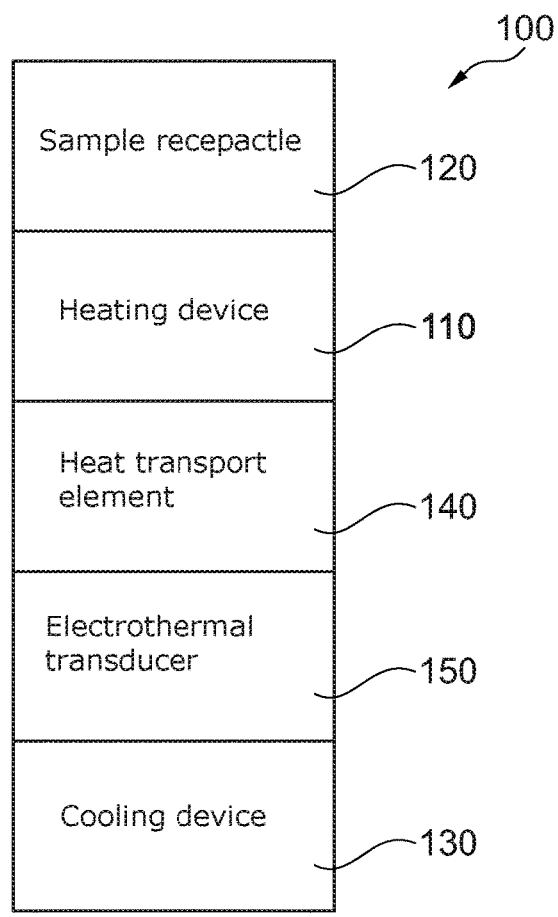
FIG. 1 shows a measuring device according to an exemplary embodiment of the invention.

FIG. 1 schematically shows the structure of a measuring device 100 according to an exemplary embodiment of the invention. The measuring device 100 has a sample receptacle 120 (e.g. two sample containers for a differential measurement) for receiving the sample(s). A heating device for increasing the temperature of the sample receptacle 120 is arranged below the sample receptacle 120. Preferably, the heating device 110 is adapted to provide a time-dependent increasing temperature gradation (i.e. a temperature profile) with respect to the sample. A heat transport element 140 is positioned below the heating device 110, the heat transport element having a thermal resistance (or a specific thermal conductivity). In an embodiment, the heat transport element comprises a nickel alloy. The measuring device 100 further comprises a cooling device 130 for reducing the temperature of the sample receptacle 120 (or for reducing the temperature in the measuring device 100). Preferably, the cooling device 130 is adapted to provide a time-dependent decreasing temperature gradation (i.e. a temperature profile) with respect to the sample. The heating device 110 and the cooling device 130 are spatially separated from each other. Nevertheless, a heat flow between the heating device 110 and the cooling device 130 is enabled by means of the heat transport element 140. However, the heat transport element 140 is not directly connected to the cooling device 130. Instead, an electrothermal transducer 150 (e.g. a Peltier element) is provided directly between the heat transport element 140 and the cooling device 130 in such a way that a direct spatial (physical) contact (or touch) between the cooling device 130 and the heat transport element 140 is prevented (made impossible). The electrothermal transducer 150 is arranged here so that an operation of the electrothermal transducer 150 may selectively and dynamically adjust the heat flow through the heat transport element 140 (or the thermal resistance of the heat transport path through the heat transport element 140 and the electrothermal transducer 150). Operating the electrothermal transducer 150 in a heating mode (or turning off the electrothermal transducer 150) has the effect of reducing the heat flow (or increasing the thermal resistance of the heat transport path 140, 150). Accordingly, this mode will be used if the temperature of the sample receptacle 120 is to be increased. Due to the increased thermal resistance, less produced heat is transported away from the heating device. At the same time, the increased thermal resistance acts as a shield against the cooling device. On the other hand, Operating the electrothermal transducer 150 in a cooling mode has the effect of increasing the heat flow through the heat transport element 140 (or reducing the thermal resistance of the heat transport path 140, 150). Accordingly, this mode will be used if the temperature of the sample receptacle 120 is to be reduced. The reduced thermal resistance allows the heat of the heated sample receptacle to be quickly removed. At the same time, the cooling effect of the cooling device is now no longer shielded.

Figure 2:
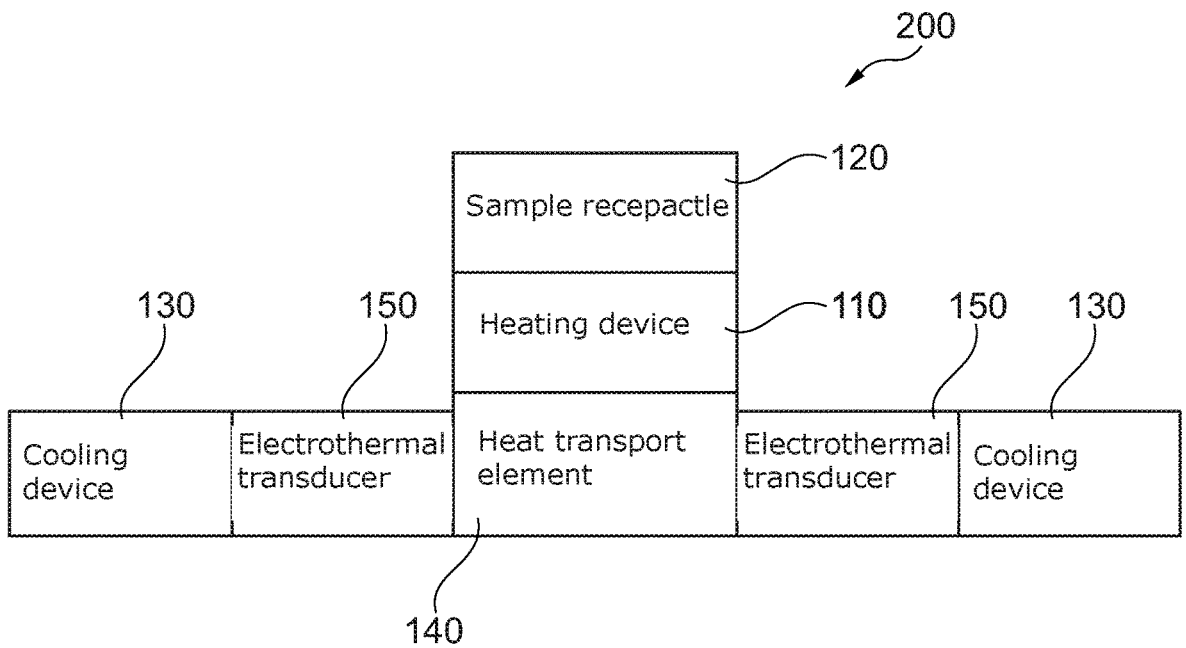
FIG. 2 shows a measuring device according to a further exemplary embodiment of the invention.

FIG. 2 schematically shows the structure of a measuring device 200 according to a further exemplary embodiment of the invention. In contrast to FIG. 1, two cooling devices 130 are provided, each of which is arranged laterally of the heat transport element 140 and the heating device 110, respectively. Accordingly, two electrothermal transducers 150 are used, each of which is inserted between the heat transport element 140 and one of the cooling devices 130. Alternatively, it may be shown that a single cooling device 130 surrounds the heat transport element 140 and/or the heating device 110.

Figure 3:
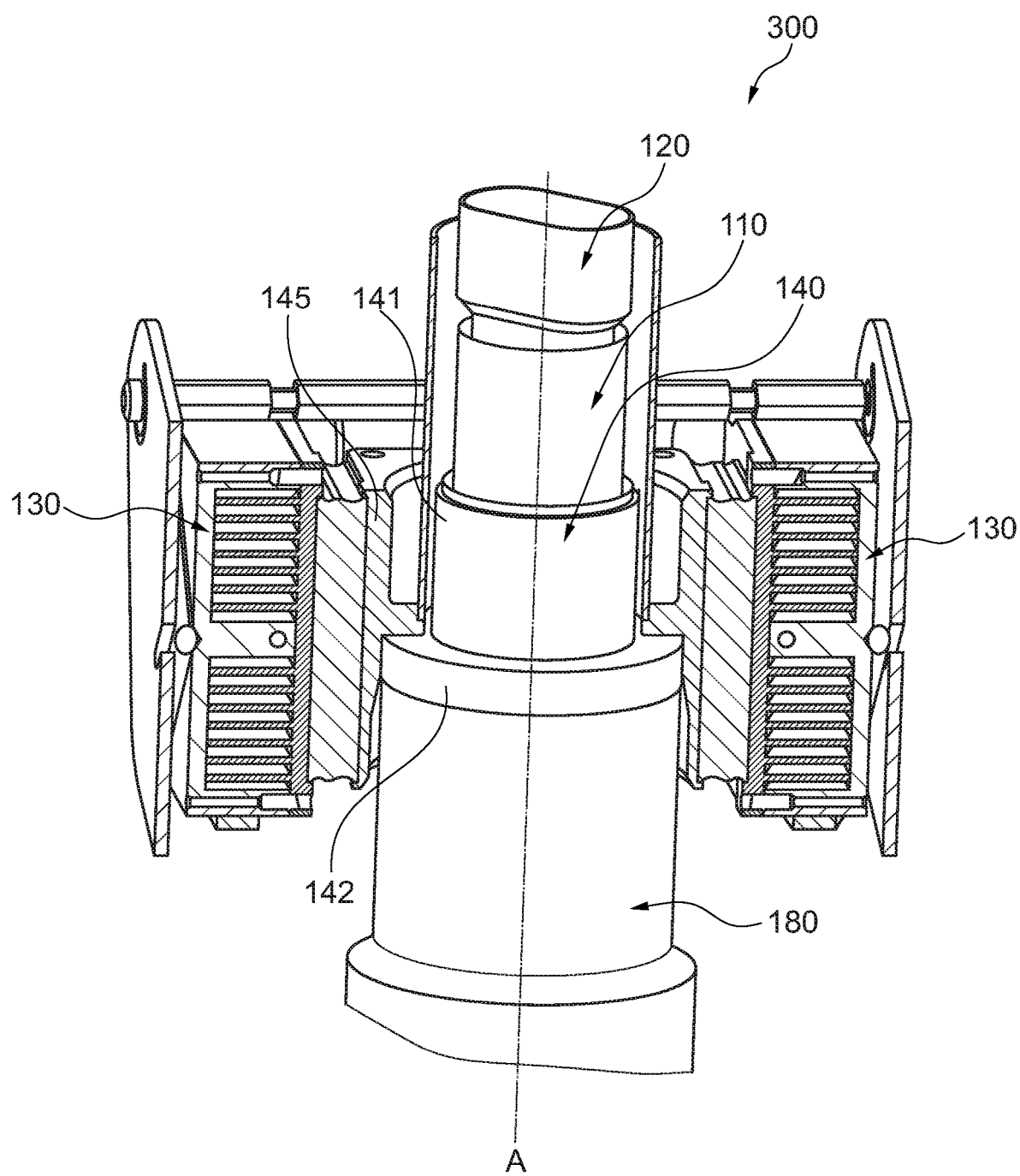
FIG. 3 shows an implementation of the measuring device according to another exemplary embodiment of the invention.

FIG. 3 shows an implementation of a measuring device 300 as schematically described in FIG. 2 according to an exemplary embodiment of the invention. Along a main axis A, the following are arranged from top to bottom: the sample receptacle 120 (measuring chamber), the heating device 110, a first part 141 of the heat transport element 140, a second part 142 of the heat transport element 140, and an insulating base 180. The first part 141 of the heat transport element 140 is designed in the shape of a tube (barrel) and connects the heating device 110 to the second part 142 of the heat transport element 140, which is designed in the shape of a flange or disc. The shown embodiment of the heat transport element 140 has been found to be advantageous from an energy point of view, but a variety of further (advantageous) embodiments of the heat transport element 140 are possible. Around the first and second parts 141, 142 of the heat transport element 140 a heat coupling element 145 is fixed, which in principle is also a heat transport element 140 (e.g. made of copper). The heat coupling element 145 is optional and, in the example shown, serves an efficient mounting or fixation (of the cooling device 130). Peltier elements 150, which are used as electrothermal transducers to selectively adjust the thermal resistance of the heat transport element 140, are attached along the heat transport element 140 (in particular on the outer face of the heat coupling element 145). The cooling device 130 has two heat sinks, which are arranged laterally of the heat transport element 140 (or perpendicular to the main axis A). As explained above, the Peltier elements 150 are directly fixed (clamped) between the heat transport element 140 and the cooling device 130, thus preventing any physical (spatial) contact between the heat transport element 140 and the cooling devices 130.

Supplementally, it should be noted that "comprising" does not exclude other elements or steps and "one" or "a" does not exclude a plurality. It should further be noted that features or steps that have been described with reference to any of the above embodiments may also be used in combination with other features or steps of other embodiments described above. Reference signs in the claims are not to be regarded as a limitation.

REFERENCE SIGNS 100, 200, Measuring device
300
110 Heating device
120 Sample receptacle
130 Cooling device
140 Heat transport element
141 Heat transport element first part
142 Heat transport element second part
145 Heat coupling element
150 Electrothermal transducer, Peltier element
180 Base

The invention claimed is:

1. A measuring device for thermal analysis of a sample, the measuring device comprising:
   a sample receptacle for receiving the sample;
   a heating device for increasing the temperature of the sample receptacle;
   a cooling device for reducing the temperature of the sample receptacle;
   a heat transport element having a thermal resistance and being arranged between the heating device and the cooling device such that a heat flow between the heating device and the cooling device is enabled via the heat transport element; and an electrothermal transducer arranged between the heat transport element and the cooling device such that operating the electrothermal transducer adjusts the heat flow through the heat transport element;

wherein the sample receptacle comprises two sample containers; and wherein the measuring device is configured to perform a differential measurement with respect to the two sample containers; and wherein the electrothermal transducer comprises a Peltier element.

2. The measuring device according to claim 1, wherein the electrothermal transducer is operable in a heating mode and/or in a cooling mode.

3. The measuring device according to claim 1, wherein the electrothermal transducer is arranged between the heat transport element and the cooling device such that a direct contact between the heat transport element and the cooling device is prevented.

4. The measuring device according to claim 1, wherein the measuring device is a differential scanning calorimeter or a differential thermal analysis measuring device.

5. The measuring device according to claim 1, wherein the heating device is adapted to provide a time-dependent increasing temperature profile.

6. The measuring device according to claim 1, wherein the cooling device is adapted to provide a time-dependent decreasing temperature profile.

7. The measuring device according to claim 1, wherein the cooling device comprises at least one of the group consisting of: a heat pipe, a heat sink, a cryostat, a Peltier element, a heat exchanger.

8. The measuring device according to claim 1, wherein the measuring device is configured such that operating the electrothermal transducer comprises: controlling or regulating the thermal resistance of the heat transport path.

9. The measuring device according to claim 1, wherein the measuring device is configured such that operating the electrothermal transducer in a heating mode or turning off the electrothermal transducer increases the thermal resistance of a heat transport path through the heat transport element and the electrothermal transducer, and reduces the heat flow through the heat transport element.

10. The measuring device according to claim 1, wherein the measuring device is configured such that operating the electrothermal transducer in a cooling mode reduces the thermal resistance of the heat transport path through the heat transport element and the electrothermal transducer, and increases the heat flow through the heat transport element.

11. The measuring device according to claim 1, wherein the measuring device is configured such that operating the electrothermal transducer in a cooling mode produces a lower temperature in the measuring device than without operating the electrothermal transducer in the cooling mode.

12. The measuring device according to claim 11, wherein the lower temperature is minus 40° C. or less.

13. The measuring device according to claim 1, wherein the heat transport element comprises a metal or a functional ceramic.

14. The measuring device according to claim 13, wherein the metal comprises nickel or a nickel alloy.

15. The measuring device according to claim 1, wherein the heating device is arranged below the sample receptacle or located in a circular manner around the sample receptacle.

16. A method of operating a measuring device for thermal analysis comprising a sample receptacle with two sample containers, a heating device and a cooling device coupled together by a heat transport element via a heat flow, the method comprising:

providing an electrothermal transducer between the heat transport element and the cooling device;

operating the electrothermal transducer in a heating mode or turning off the electrothermal transducer in order to reduce the heat flow through the heat transport element;

operating the electrothermal transducer in a cooling mode in order to increase the heat flow through the heat transport element;

performing a differential measurement with respect to the two sample containers; and wherein the electrothermal transducer comprises a Peltier element.

17. The method according to claim 16, wherein the method further comprises:

providing a sample in a sample receptacle of the measuring device;

increasing the thermal resistance of a heat transport path through the heat transport element and the electrothermal transducer if the temperature of the sample receptacle is increased.

18. The method according to claim 16, wherein the method further comprises:

providing a sample in a sample receptacle of the measuring device; reducing the thermal resistance of the heat transport path through the heat transport element and the electrothermal transducer if the temperature of the sample receptacle is reduced.

* * * * *